Oct. 14, 1930.  C. L. HEISLER  1,778,635
MOTION PICTURE PROJECTOR
Filed Feb. 26, 1929
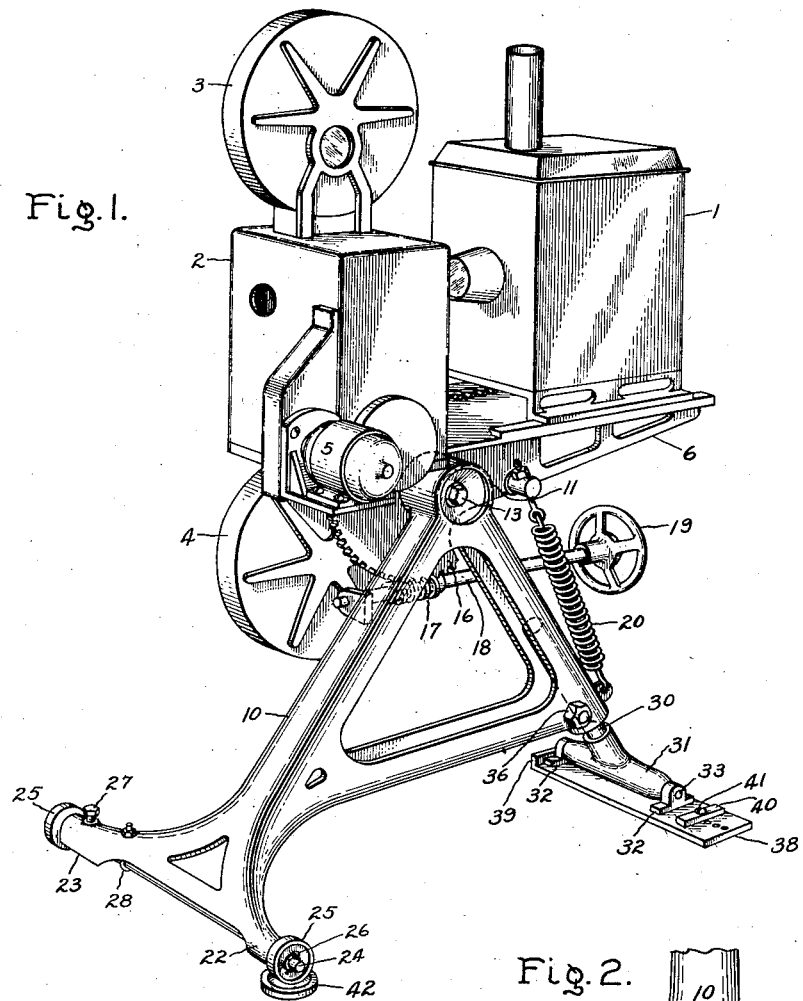
Inventor
Charles L. Heisler,
by Charles E. Mullan
His Attorney.

Patented Oct. 14, 1930

1,778,635

UNITED STATES PATENT OFFICE

CHARLES L. HEISLER, OF SCHENECTADY, NEW YORK, ASSIGNOR TO GENERAL ELECTRIC COMPANY, A CORPORATION OF NEW YORK

MOTION-PICTURE PROJECTOR

Application filed February 26, 1929. Serial No. 342,801.

My invention relates to motion picture projectors and particularly to that part of the projector which constitutes the supporting structure thereof. The object of my invention is the provision of an improved projector supporting structure of simple and sturdy construction, which is adapted to provide for all of the various adjustments, automatic and manual, found desirable in the commercial use of such apparatus and for the convenience of the operator, and which is easy to manipulate and inexpensive to manufacture.

My invention will be better understood from the following description taken in connection with the accompanying drawing, and its scope will be pointed out in the appended claims.

In the drawing, Fig. 1 is a perspective view of a motion picture projector embodying my invention and Figs. 2, 3 and 4 show details thereof.

Referring to the drawing, 1 represents the usual lamp housing and 2 is the mechanism casing to which are attached, above and below, the film magazines 3 and 4. I have chosen to show a projector which is adapted for use not only in the projection of motion pictures but also in the reproduction of sound to accompany the pictures, both the picture and the sound record being formed on the same film. The mechanism in casing 2 by means of which the film is driven for the picture projection and the sound reproduction is operated, in the projector illustrated, by the motor 5. The casing 2 with the film magazines and motor is fixed to the bracket 6. The lamp housing, however, has guides which engage guides on the bracket to permit of a certain amount of adjustment toward and from the casing and has a rack formed thereon with which meshes the pinion 7 mounted in the bracket 6 and operated by the hand wheel 8. To lock the lamp housing in any desired position I have provided the thumb screw 9 which is positioned to engage the teeth of the pinion 7.

Pivotally supporting the bracket 6 is the base 10 which I have shown as a casting having a general A form wherein the metal is distributed to the best advantage for strength and stability. At the pivotal connection with the bracket, the base is provided with the circular bearing head 11 which has a portion at least of its interior surface machined to form a cylindrical bearing face. The bracket 6 has a depending portion which is provided with a rabbet 12 which is machined to fit the cylindrical bearing face in the head 11. These two parts are held in assembled relation by the center bolt 13 which clamps together the end head 14 and a corresponding portion 15 of the bracket. By this construction the entire weight of the bracket and the parts supported thereby which are comparatively heavy is carried by the cylindrical bearing face in the bearing head rather than by the bolt 13, the sole function of the latter being to retain the bracket and base in proper assembled relation. For tilting the bracket and apparatus supported thereon relative to the base the bracket is provided with the worm gear segment 16 with which meshes the worm 17 on shaft 18 which is suitably mounted in the base and is provided with the hand wheel 19. Inasmuch as the center of gravity of the bracket and the apparatus thereon is at some point above the pivotal center thereof, I have shown the counterbalance spring 20 between the base and the bracket which as the bracket is tilted downward from the position illustrated becomes effective to relieve the worm gearing of a certain amount of pressure and thereby facilitate the turning of the hand wheel.

The base 10 is formed with two fixed front legs 22 and 23 through which extends the shaft 24 shown having rollers 25 on its ends held by cotter pins 26. Leg 22 has a somewhat loose bearing for the shaft. Leg 23 has a vertical slot for receiving the shaft at the top of which is the adjusting or leveling screw 27 for supporting the leg on the shaft. The hook 28 secured to leg 23 limits the downward movement of shaft 24.

In apparatus of this character it is desirable that supporting means of the utmost steadiness be provided. It is also desirable for reasons of stability that the support have at least four legs but, as is well known, a fourlegged structure seldom sets firmly in all four legs in any given spot until a shim has been placed under one of the legs or some other adjustment has been made. I have accordingly provided a rear leg structure for the base 10 which has two spaced floor engaging portions or legs and which automatically adjust themselves to inequalities in the floor so as to form a firm and steady support for the apparatus. The rear leg structure which I have devised also provides for another important function, namely that of supporting the base in a tilted position, where an unusual inclination of the apparatus is necessary. The rear portion of the base 10 has a bore which forms a bearing for the cylindrical shank 30 of the leg member 31. This member is shown as T-shaped and provided with the shoes 32 pivoted on reduced extensions 33 of the member. In some cases it may be found more desirable to use rollers instead of shoes on leg member 31. For securely clamping the shank 30 in the base 10 I have provided the bolt 35, see Fig. 4, having nut 36. The bolt has a notched portion for receiving the shank 30 so that a clamping action takes place between the shank and the base when the nut is tightened. It will be noted that the socket and shank are inclined to make an acute angle with the floor. Because of this inclination the leg member, when nut 36 is loosened, angularly adjusts itself to the floor automatically so that the two feet 32 bear equal portions of the load.

In some installations, for example in theatres, where the projection room is located so high above the screen that the line of projection is relatively steep it becomes desirable to tilt the apparatus at an unusually large angle. By means of the construction which I have provided additional tilting of the apparatus may be effected by simply raising the rear portion of the base when, with the nut 36 loosened, the rear leg member 31 remains on the floor while the shank 30 slides in its socket. Because of the inclination of the socket, the base when released is frictionally retained in the elevated or tilted position. The operator is therefore free to release his hold on the base and to insure greater rigidity and to avoid any possibility of the base slipping down on the shank due to vibration or rough handling he may then tighten the clamp nut 36. The inclination angle of the socket is not critical and may be varied within a considerable range. In apparatus which has been constructed in accordance with my invention the bracket 6 could be tilted down from the horizontal position illustrated a maximum of about 30 degrees when the rear portion of the base or that supported by the leg member 31 was in its lowest position. With the base in this position the inclination angle of the socket and the shank therein was 60 degrees from the horizontal or floor. An additional 15 degrees of tilt of the light beam was made possible by raising the rear portion of the base which was automatically retained in the elevated position by the leg member 31.

While in most motion picture installations the projector, having been adjusted angularly to the screen, remains indefinitely in that position, in others the operator must be able to swing the projector laterally and to operate it in either one of two definite angular positions. For example, if the theatre is provided with two screens one behind the other and if the projector is located at one side of the center line of the theatre, the operator must be able to shift the projector through a definite angle so as to project on either the one or the other screen. To facilitate this use of the projector I have provided the floor plate 38 upon which the feet of the rear legs are adapted to slide and which have means for limiting the amount of movement thereon of the feet. On the drawing I have shown by way of example a limiting flange 39 at one end of the plate and an adjustable stop 40 which by the screw 41 may be secured to the plate in various adjusted positions. To prevent accidental shifting of the projector in a forward or rearward direction I may set one of the front leg rollers in a cup as shown at 42.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. A motion picture projector support comprising a tiltable base having a pair of fixed front legs, a bearing socket at the rear portion, a member having a second pair of legs and a shank rotatably and slidably mounted in said socket, the axis of said socket being inclined with a floor upon which the projector support rests, such that the member adjust itself rotatably to cause all four legs to engage the floor but is frictionally retained against sliding further into the socket.

2. A tiltable motion picture projector support comprising a base adapted to rest upon and to automatically adjust itself to an uneven floor including a frame member having a pair of fixed legs at its forward portion and a fixed bearing socket at its rear portion, and a member having a second pair of legs and a shank journalled in said socket, said shank and socket being inclined at an acute angle with the floor such that the leg member remains on the floor when the frame member is tilted by raising the rear portion thereof, frictionally retains the frame member in tilted position and angularly adjusts itself to cause all four legs to engage the floor.

3. A tiltable motion picture projector base comprising a frame member having a pair of fixed legs at its forward portion and having a fixed inclined guide socket at its rear portion, and a leg member having a shank engaging said guide socket, the angle between said guide socket and the horizontal being such that the leg member remains on the floor when the frame member is tilted by raising the rear portion thereof and frictionally retains the frame member in tilted position.

4. A tiltable motion picture projector base comprising a rigid member having a pair of fixed legs at one portion thereof, and a leg member having a slidable connection with said member at another portion thereof, said slidable connection being inclined to the horizontal such that when said first member is tilted by raising said other portion thereof the leg member freely slides downwardly thereon and frictionally retains the first member in tilted position when the same is released.

5. A motion picture projector base adapted to rest upon and to automatically adjust itself to an uneven floor comprising a frame member having a pair of fixed legs and a fixed bearing socket inclined to make an acute angle with the floor, and a member having a second pair of legs and a shank fitting said socket whereby said second member angularly adjusts itself to cause all four legs to engage the floor.

6. A motion picture projector base adapted to rest upon and to automatically adjust itself to an uneven floor comprising a frame member having a pair of fixed legs, and a member having a second pair of legs and having a pivotal connection with the frame member at a point spaced from the fixed legs thereof and on an axis making an angle with said floor such that the member angularly adjusts itself to cause both legs thereof to engage the floor.

7. A motion picture projector base having a plurality of legs, a shaft connecting two of said legs having rollers mounted on opposite ends thereof, one of said two legs forming a loose bearing for said shaft and the other having a vertical slot receiving said shaft, a screw in said other leg for supporting the same on the shaft and a hook on said other leg engaging the shaft to prevent the displacement thereof from the slot.

8. A motion picture projector arranged for projection upon each of a plurality of screens requiring an angular adjustment of the projector when shifting from one screen to another comprising a supporting base having front and rear legs, a transverse floor plate slidably supporting said rear legs and means on said plate for adjustably limiting the movement of the legs thereon.

9. A motion picture projector having a base portion provided with front and rear legs, means for pivotally supporting a front leg on the floor and a floor plate arranged to slidingly support said rear legs whereby the projector may be angularly adjusted about said means as a center, said plate having means for limiting the sliding movement of the legs thereon.

In witness whereof, I have hereunto set my hand this 25th day of February, 1929.

CHARLES L. HEISLER.